March 3, 1936.  H. F. FLOWERS  2,032,840
DUMP VEHICLE
Filed Nov. 3, 1931  9 Sheets-Sheet 1

Inventor,
Henry Fort Flowers.

March 3, 1936.  H. F. FLOWERS  2,032,840
DUMP VEHICLE
Filed Nov. 3, 1931   9 Sheets-Sheet 2
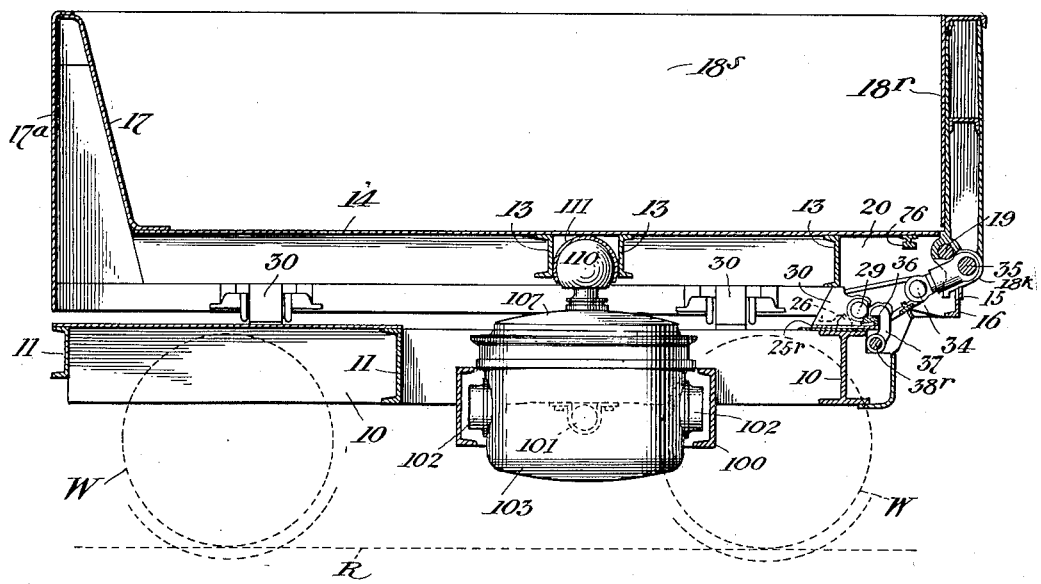
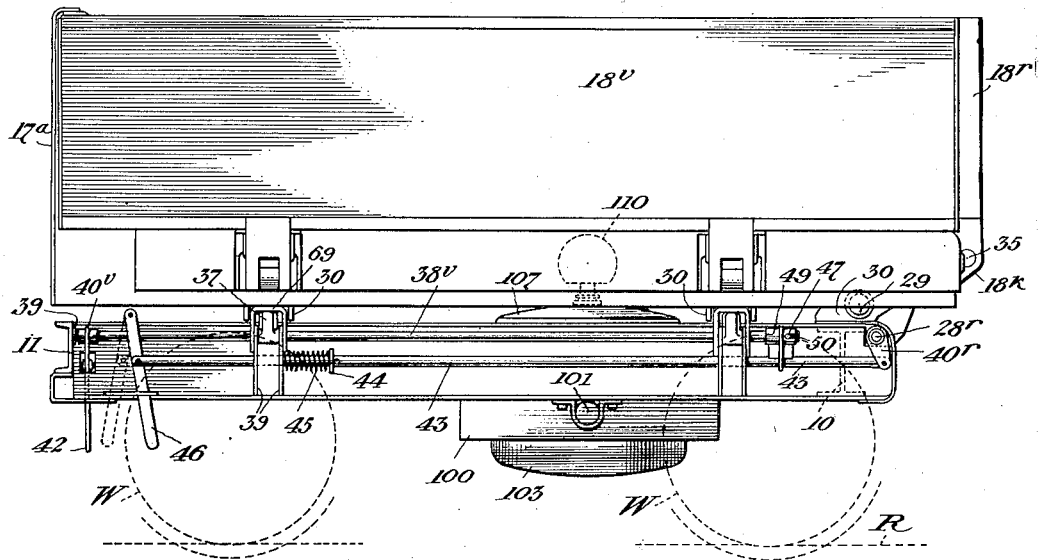
Inventor,
Henry Fort Flowers.
By
Attorneys.

March 3, 1936.  H. F. FLOWERS  2,032,840
DUMP VEHICLE
Filed Nov. 3, 1931   9 Sheets-Sheet 3

Inventor,
Henry Fort Flowers.

March 3, 1936.  H. F. FLOWERS  2,032,840
DUMP VEHICLE
Filed Nov. 3, 1931  9 Sheets-Sheet 4

Fig. 6.

Inventor,
Henry Ford Flowers.

March 3, 1936.  H. F. FLOWERS  2,032,840
DUMP VEHICLE
Filed Nov. 3, 1931   9 Sheets-Sheet 5
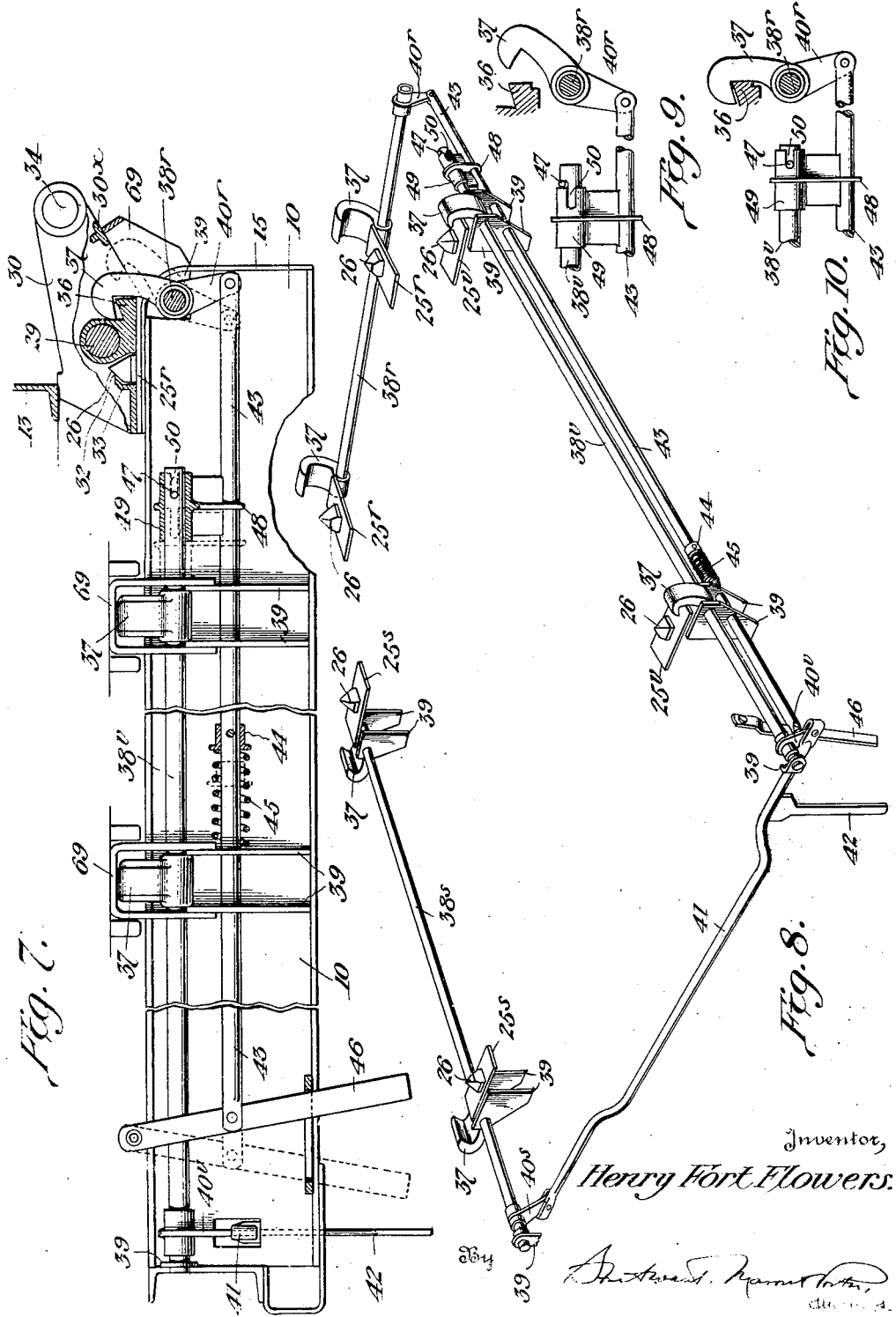

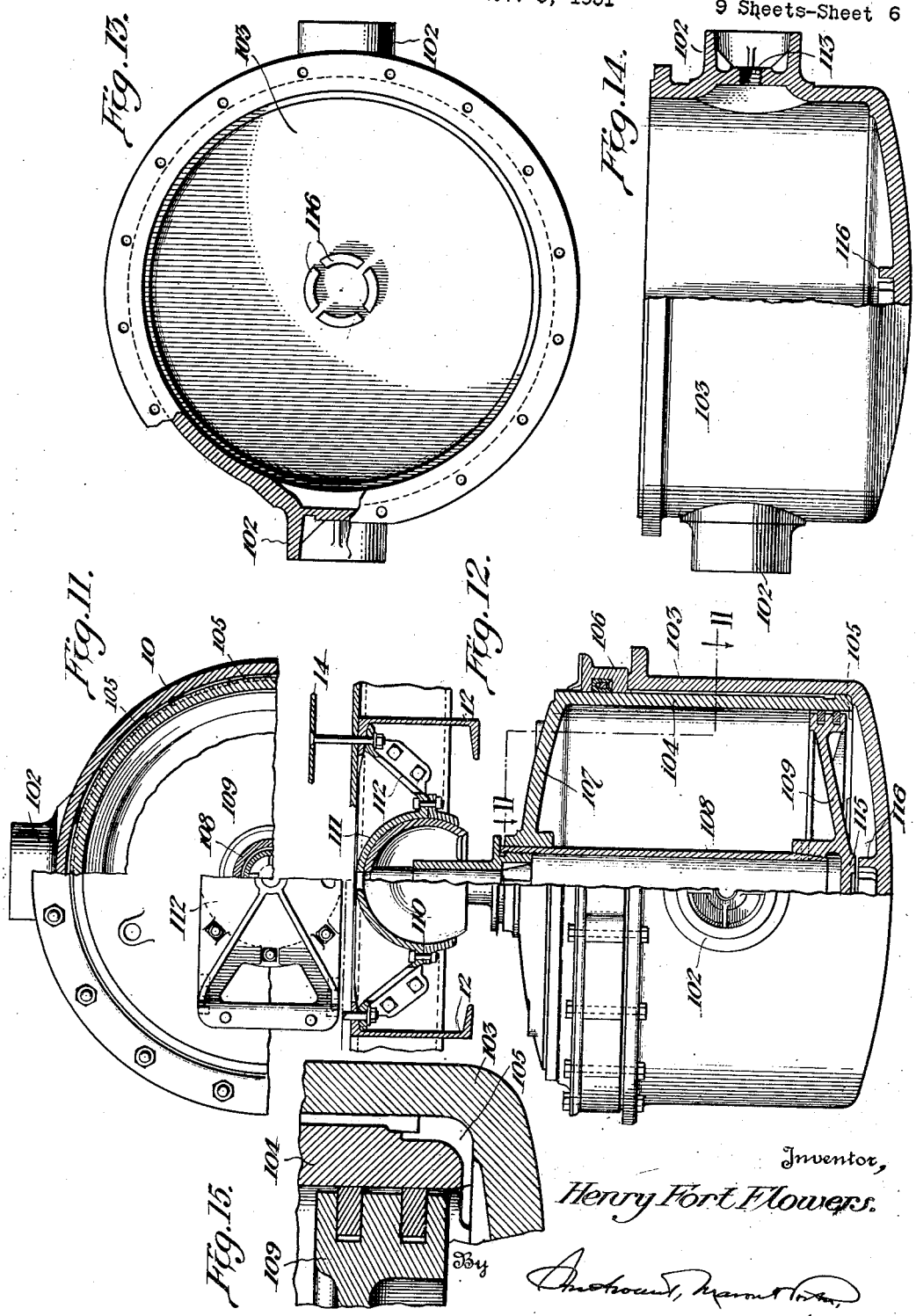

March 3, 1936. H. F. FLOWERS 2,032,840
DUMP VEHICLE
Filed Nov. 3, 1931 9 Sheets-Sheet 7

Inventor
Henry Fort Flowers.
By
Attorneys.

March 3, 1936.    H. F. FLOWERS    2,032,840
DUMP VEHICLE
Filed Nov. 3, 1931    9 Sheets-Sheet 8

Inventor,
Henry Ford Flowers.
By
Attorneys.

March 3, 1936.　　　H. F. FLOWERS　　　2,032,840
DUMP VEHICLE
Filed Nov. 3, 1931　　9 Sheets-Sheet 9
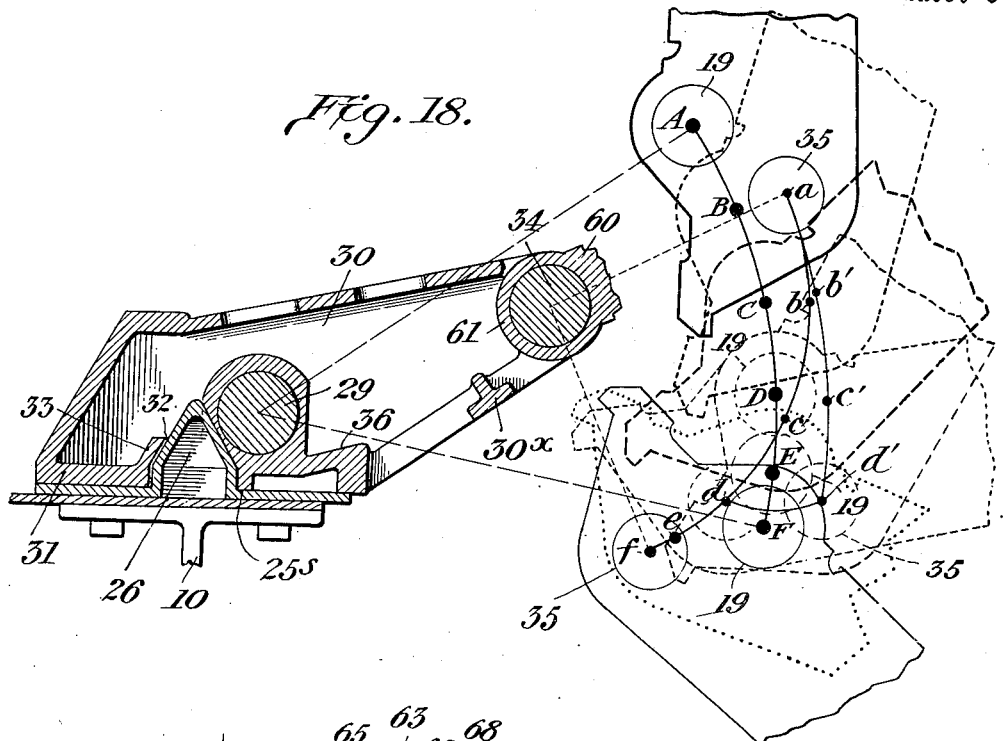
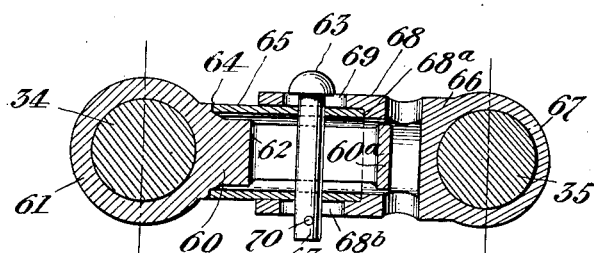
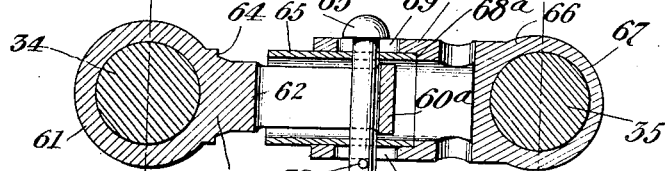
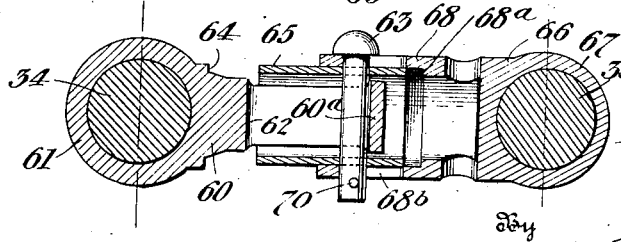
Inventor,
Henry Fort Flowers.
By
Attorneys.

Patented Mar. 3, 1936

2,032,840

UNITED STATES PATENT OFFICE 2,032,840

DUMP VEHICLE

Henry Fort Flowers, Findlay, Ohio

Application November 3, 1931, Serial No. 572,855

17 Claims. (Cl. 298—18)

This invention relates to improvements in dump vehicles, and more particularly relates to vehicles which may be dumped in two directions which are at right angles to one another.

One of the features of the present invention is the provision of a vehicle having a tiltable dump body and doors at the points at which dumping is to be effected, these doors being automatically controlled by the tilting movement of the body.

Another feature of the invention is a three way dump vehicle, having side doors and a rear door, which are automatically actuated and controlled in their actuation, during tilting of the body in the corresponding direction.

A further feature of the invention is the provision of independent but interlocking side and rear latches for the body, whereby the direction of tilting of the body and the actuation of the doors is determined.

Still another feature of the invention is the provision of door control devices which are permanently connected to the body and moved therewith, and which are adapted to be selectively held to the frame by a latch system.

A still further feature of the invention is the provision of body centering devices for holding the body in its proper relative position to the frame, and for insuring return of the body to such proper position during its movement back from tilted position.

A still further feature of the invention, in the specific form illustrated, is the provision of side and rear devices for supporting the body on the frame and including door control elements and latches therefor which are identical in shape for both side and rear doors, so that the number of shapes of individual elements is reduced.

An illustrative form of constructing a dump vehicle of this type is set forth in the accompanying drawings by way of example. In these drawings:

Figure 3 is a longitudinal vertical section.

Figure 4 is a side elevation.

Figure 6 is a longitudinal vertical sectional view, corresponding to Figure 3, but showing the body in tilted position.

Figure 7 is a side elevation of the underframe, with associated parts, on a larger scale than that of Figure 4.

Figure 8 is a perspective view showing the latch devices for controlling the direction of tilt.

Figures 9 and 10 are detail views of an interlock device for the tilt latches, in two positions.

Figure 11 is a fragmentary top plan view, with parts broken away and in section on line 11—11 of Figure 12, of the tilting power unit.

Figure 12 is a side elevation, with parts broken away, of this unit.

Figure 13 is a top plan view of the outer cylinder, with a part broken away.

Figure 14 is a side elevation of the same, with parts broken away, showing the trunnion connections.

Figure 15 is a detail view, on a larger scale, showing the fluid passages between the piston and a cylinder of the power unit.

Figure 18 is a diagrammatic view showing the successive changes of positions of the parts in passing from the position of Figure 16 to that of Figure 17.

Figure 1:
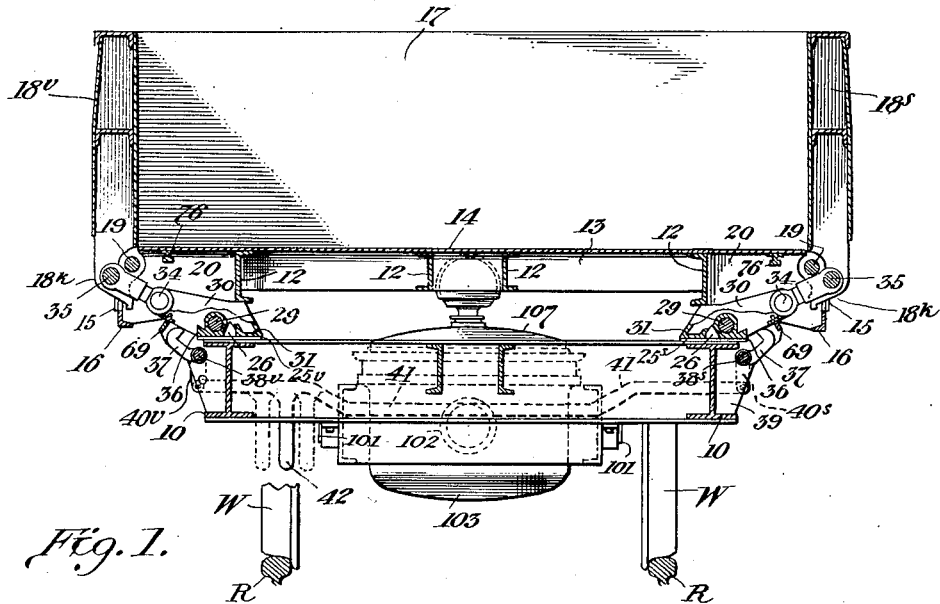
Figure 1 is a vertical transverse section through the vehicle.
Figure 2:
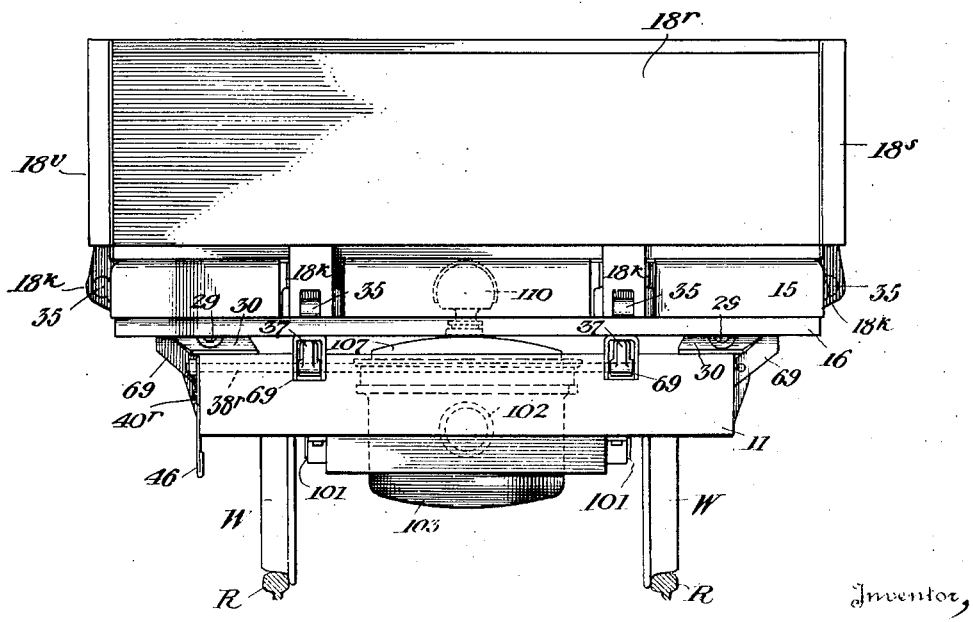
Figure 2 is an end elevation thereof.

Figures 19, 20, and 21 show the successive positions of the door control links under various conditions.

In these drawings, the invention is shown applied to a car traveling on rails R and having flanged wheels W for supporting a main frame comprising the longitudinal frame members 10 and the transverse frame members 11. Longitudinal body beams 12 and transverse body beams 13 support the body floor 14 which is bent over at the sides and rear end to form skirts 15 which are secured to the longitudinal and transverse reinforcing angle irons 16. A front sheet 17 is joined to the floor 14. Side doors 18s and 18v are provided, and an end door 18r. These doors are mounted by pivots 19 to the gusset plates 20 which extend downward from the car bottom and are joined to the longitudinal and transverse car body beams 12, 13, so that the car floor, body beams and gusset plates form a rigid structure. It is preferred to stiffen the end sheet 17 by providing an outer sheet 17a at the end of the car (Figure 3).

On the side and rear under frame members 10 and 11 are provided pairs of plates 25s, 25v and 25r, each of which is provided with an upstanding pyramidal centering and securing lug 26 (Figure 8).

Mounted on the pivots 29 of the gussets 20 (Fig.

16) are door control feet 30 having flat webs 31 adapted to rest on the corresponding plates 25s, 25v, 25r when the body is in transport position. Each of the plates 31 is provided with an aperture 32 having upturned flanges 33 for cooperation with the aligning and securing pins 26. Each foot 30 extends outwardly from the car frame, with a slight upward angle and carries at its outer end a pivot 34 to which is secured a door control link which at its other end is connected by a pivot 35 to the respective door, as will be described in detail hereinafter.

Each foot 30 likewise provides a ledge 36 for engagement by a claw 37 of a latch system. As shown in Figure 8, the claws 37 for the right hand side of the body are fixedly mounted on a latch shaft 38s, while the claws 37 for the left hand side of the body are fixedly mounted on the latch shaft 38v and the claws 37 at the rear of the body are mounted fixedly on the transverse latch shaft 38r. Shaft 38s is pivoted in the underframe brackets 39, and is provided with a crank arm 40s which is pivotally connected by a link 41 with the crank arm 40v on the latch shaft 38v. A handle 42 is secured to the link 41 so that the two shafts 38s and 38v may be simultaneously rocked. The rear latch shaft 38r is likewise pivotally mounted on brackets 39 secured to the car frame, and carries a crank 40r loosely pivoted to the link 43 which may slide longitudinally in the brackets 39 at the left side of the frame. A collar 44 on link 43 operates to compress a spring 45 against one bracket 39 when the link 43 is moved to a disengaging position for the rear latch claws 37. A handle 46 is pivoted to the frame and to the link 43 and serves to move the latter back and forth. On the end of shaft 38v is a radial interlocking pin 47. A plate 48 is secured to link 43 and carries a sleeve 49 which may slide freely back and forth on the shaft 38v when the notch 50 of collar 49 is in alignment with the interlock pin 47 (Figures 9 and 10), but is prevented from rightward movement when these elements are not in alignment (Fig. 9).

The skirts 15 are cut away from point to point to permit the door knuckles 18k to extend inward therethrough for support upon the door hinge pins 19, and also to permit the passage of the door control links connecting the pivots 34 and 35.

Each of these links comprises an inner telescoping link member 60 having an eye 61 at its end to receive the pivot 34 and a slot 62 for the reception of the link draft pin 63 (Figures 19, 20, and 21), as well as a shoulder 64 against which a crushing sleeve 65 may rest. The outer telescoping link 66 has an eye 67 for the reception of the pivot pin 35, and its sleeve 68 closely embraces the crushing tube 65 and has a shoulder 68a to engage the end thereof (Figs. 20 and 21), and is provided with slots 68b for the reception of the link draft pin 63 which passes through simple apertures in the crushing sleeve 65. Preferably a cotter or like pin 70 is employed to hold the link draft pin 63 in position.

Figure 16:
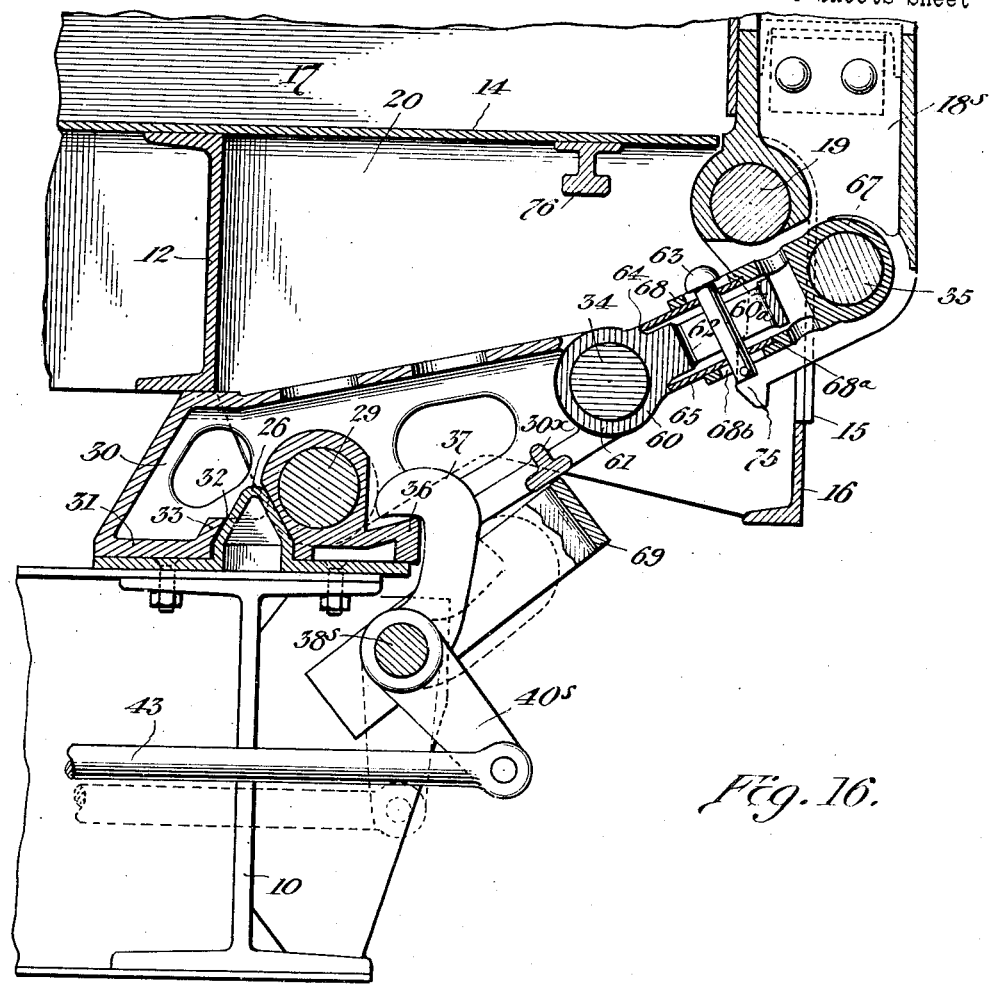
Figure 16 is a detail view, on a larger scale, of one of the door control elements, with the body in transport position.
Figure 17:
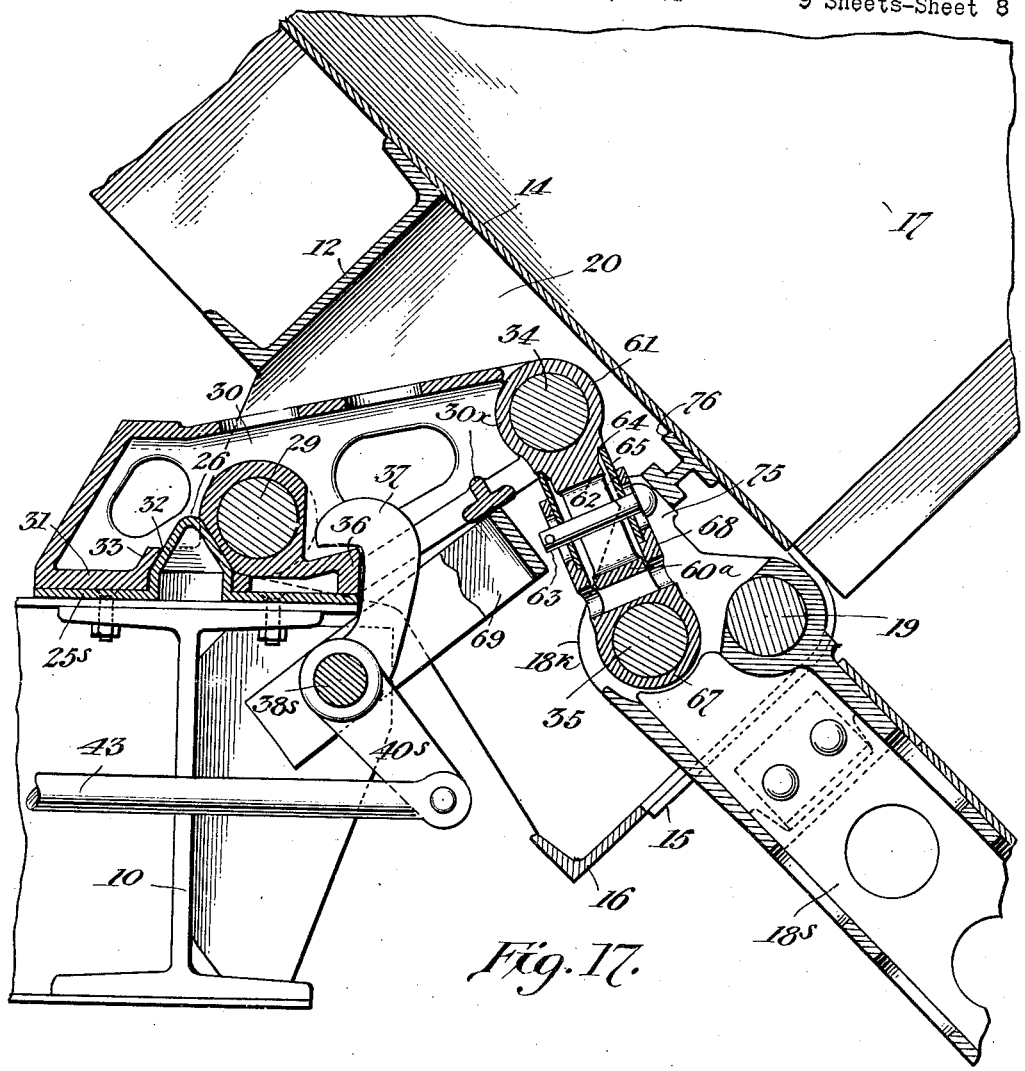
Figure 17 is a corresponding view, with the body in tilted position.

The end of each door knuckle is provided with a stop lug 75 which, in the open position of the door (Figure 17), comes to rest against a stop rail 76 secured beneath the body bottom 14 and thus positively limits the opening movement of the door. When in the transport position, the body members 12 and 13 preferably rest upon the tops of the door control feet 30 (Figures 1, 3, and 16) so that the weight is transmitted directly from the body bottom to the underframe in a substantially straight line, whereby to relieve the pivots from exerting bending stresses upon the various elements during normal transport. To assure against tilting of these feet the loops 69 are provided on the frame, extending outwardly and upwardly into engagement with cross rails 30x on the feet 30, so that the claws 37 engage the feet 30 between two points of support on the car frame.

Figure 5:
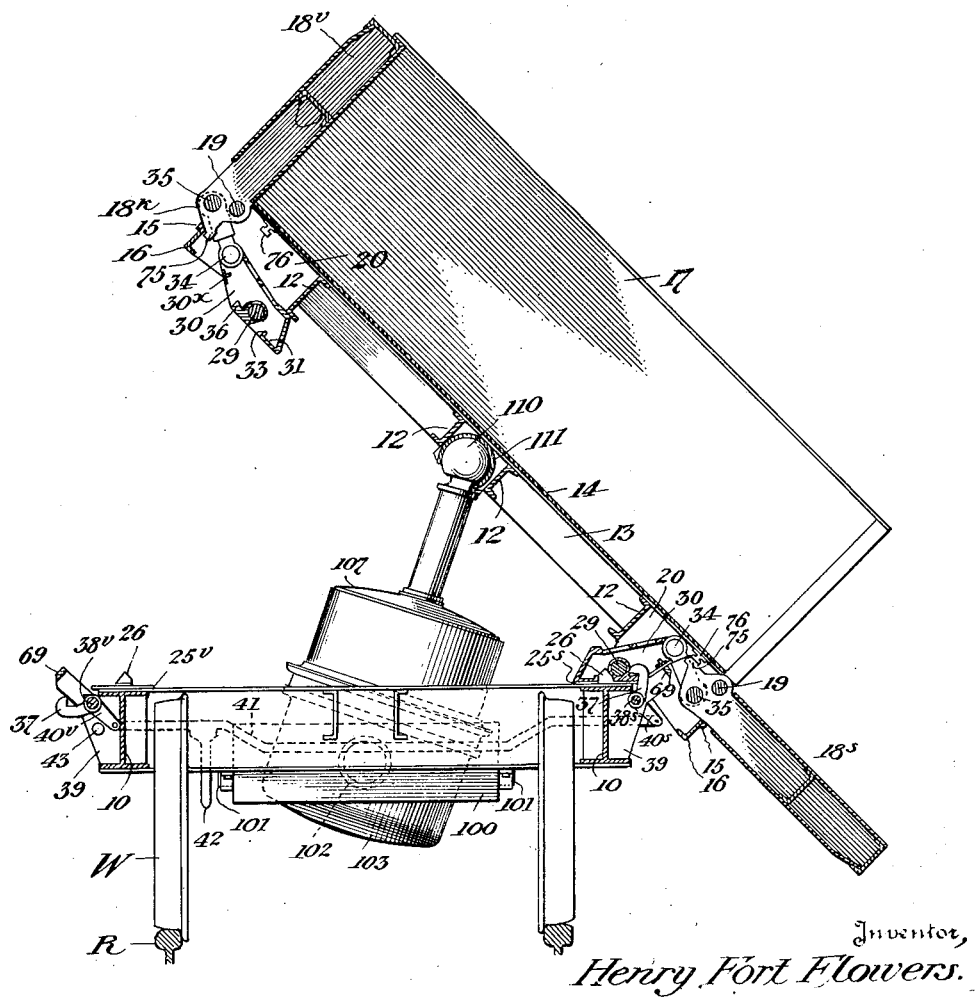
Figure 5 is a transverse sectional view corresponding to Figure 1, but showing the body in tilted position.

Further, this engagement of the frame member 12 with the foot 30 prevents rocking movement of the feet and the compression links 60, 66, and therewith the opening of the door, while the body is being tilted about the opposite fulcrum: thus in Figure 5, the left-hand door 18v is being held closed while tilting is occurring about the right-hand fulcrum 29.

Any suitable type of power unit may be employed, but a preferred form is set forth in Figures 1 to 6 and 11 to 15 in which the gimbal frame 100 is mounted by pivots 101 upon the longitudinal beams 10 of the main frame and itself is provided with bearings for the trunnion pivots 102 on the main body of outer cylinder 103 of the power unit, which is of fluid pressure type. An inner cylinder 104 formed as a hollow piston has a lower peripheral flange 105 which is cut away from point to point (Figure 15) for the passage of the fluid medium and is likewise adapted to engage the top sealing and closing flange 106 of the outer cylinder 103 whereby to limit the upward movement of the hollow piston 104. The hollow piston has an upper closing wall 107 in which is guided the hollow piston rod 108 of the inner piston 109. The piston rod 108, outside the end wall 107, is connected to a ball member 110 which fits within the ball socket 111 carried by the support 112 which is secured to the body beams 12 (Figures 5 and 12). One of the trunnions 102 is provided with a threaded connection 113 (Figure 14) by which the fluid medium may be admitted, in the collapsed condition of the unit, into the annular space between the outer cylinder 103 and the hollow piston 104, to flow down therein and through the notches in the flange 105 to the space beneath the hollow piston 104 and the inner piston 109, so that the pistons are raised and thus ball 110 is forced upwardly to produce tilting of the body. Any suitable means of control for the admission and release of the fluid medium may be employed, in manners well known in the art.

In order to provide a stop for the collapsing movement of the pistons, the inner piston 104 has a central projecting flange 115 on its bottom surface to engage the upstanding lugs 116 on the bottom wall of the outer cylinder 103 (Figures 12, 13, and 14).

When the car is in use, and in normal transport, it may be drawn from the loading point to the unloading point in the usual way. Upon arriving at the unloading point, a car attendant can select the direction of dumping by operating the levers 42, 46. When the lever 42 is in a central position, the claws 37 for the side latches are disengaged and the unlocking pin 47 is opposite the slot 50. The lever 46 is then operated by spring 45 to bring the rear claws 37 into engaging position with the lugs 36 on the rear feet 30. During this movement of the link 43, the sleeve 49 is moved until the notch 50 receives the interlocking pin 47. Thus the claws 37 at the sides of the car cannot be engaged while the claws 37 at the rear of the car are in latching position, nor the rear claws 37 while the side claws 37 at either side are engaged.

Having selected the direction for dumping, the car attendant now operates the valve which controls the access of the fluid under pressure into the power unit, so that this unit begins to extend and presses upward against the car body and causes the latter to tilt. Since four of the body latches comprising the claws 37 are disengaged, the body will tend to move and move only about the fulcrum line determined by the two claws 37 which are engaged. If, as illustratively presented in Figures 16 and 17, the claws 37 for the right hand side door are engaged with the corresponding lugs 36 (full line position), the corresponding feet 30 are thus held against rising away from the plates 25s on the frame. The body is hence compelled to tilt about the pivots 29 of the feet 30 which are held to the car frame by the claws 37, and passes from the position of Figures 1 and 16 to that of Figures 5 and 17.

Similarly, if the latch claws 37 at the left hand side are engaged, the body is caused to tilt toward the left when the power unit is operated, and therewith the left hand door 18v is selected for movement. In similar manner, also, when the latch claws 37 for the rear feet 30 are selected, the body is only free to tilt toward the rear, and such tilting occurs when the power unit is operated, and the rear door opens under the control of the body in its tilt.

In Figure 18 is shown diagrammatically the movement of the several pivots during the normal tilting movement of the car body in general. As the body tilts about the fulcrum 29, the door hinge pins 19 move successively along the circular arc A, B, C, D, E, and F. The telescoping links operate in compression between the pivot pins 34 and 35 to prevent the opening of the door at greater than a predetermined rate. If the door is free to open, the door control links continue in compression and regulate the opening of the door until the door reaches the position so that its inner plate is substantially parallel to the body bottom 14 when the body reaches the tilted position shown in Figure 17.

If, however, the door is momentarily held against opening movement, the two eyes 61, 67 of the telescoping links are pulled relatively apart so that the telescoping links pass successively from the positions shown in Figure 19 through the position of Figure 20 to the position of Figure 21. In Figure 19, the crushing sleeve 65 is operating in compression between shoulders 64 and 68a. In Figure 20, the inner link 60 has been pulled into an extended position so that its wall 60a at the outer end of slot 62 is now engaged with the link draft pin 63. In Figure 21, the wall 60a has pulled the draft pin 63 and therewith the crushing sleeve 65 until the pin 63 is at the outer end of the slots 68b. In this position, the telescoping control link is able to operate in tension to exert a pull from the pivot pin 34 upon the door pin 35 to cause a clockwise rocking of the door toward open position about the door hinge pins 19 (Figure 18). During this extension of the telescoping link, the body has tilted so that the door hinge pin has moved, for example, from position A to position B while the inner link has moved from the position of Figure 19 to the position of Figure 20; the door hinge pivot 19 continues its movement to the positions C and D while the two links are separating to the position shown in Figure 21. In the corresponding times, the door pivot 35 moves from the position a to positions b and c and then to position d, in which latter position the door control link is in its fully extended position and about to operate in tension to pull the door open. As the body continues to tilt, the door hinge pivots 19 move to position E and finally to F. Thus, the door may be opened normally as shown by the line a, b, c, d, e, f, if only a normal resistance is opposed to its opening, e. g. if the door can fall open by gravity. If, however, as is often the case when a load of wet ore is frozen to the car bottom and to the door, the door link pivot moves along the line a, b', c', d', d, e, f, and such resistance is overcome immediately by the tension effected through the door control links at point d', and the door may swing rapidly through a certain angle, until the door control links have been collapsed back into the position shown in Figure 19. This is represented in the diagram of Figure 18, by the quick radial inward movement from position d' to position d, after which the continuing movement of the body and the door hinge pivot 19 causes the movement to the position f. It will be noted that the positions e, f, are the same positions as those assumed by the axis of link pivot 35 when the door controlling links are operating simply in compression, as in Figure 17.

The interlocking relationship of the latches comprising the side and rear claws assures the proper relationship of the underframe and body at all times. Thus when either set of side claws is engaged, it is impossible to engage the other set of side claws or the rear claws. When the rear claws are engaged, the shafts for the side claws are locked against movement of these claws to engaging position. When the shafts carrying the side claws are moved to inoperative or central position, the slot 50 is brought opposite the pin 47 and thus the spring 45 operates to move the link 43 and the end claws to the operative and engaging position. Therefore, only one side or the end may be latched at a time, so that no damage can result upon the application of a tilting effort to the body with respect to the underframe. On the other hand, at least one side or the rear is at all times latched, so that the application of such a tilting effort does not cause the body to be lifted entirely away from the underframe.

I claim:

1. In a dump vehicle, a frame, a body adapted to tilt about laterally spaced and rear fulcrums for dumping, side and rear doors pivotally mounted on said body, and door control devices connected to said body to move bodily therewith whereby to hold raised doors closed during dumping and including means for engaging the frame when tilting about the adjacent fulcrum for selecting the adjacent door for automatic opening and closing movement, said devices including toggle mechanism and cooperating with the body and frame during transport and during dumping in another direction to hold the associated doors closed.

2. In a dump vehicle, a frame, a tiltable dump body, side and rear doors pivotally mounted on said body, foot members resting on said frame during transport, pivots for connecting said foot members and body whereby the body may tilt about laterally spaced and rear fulcrums for dumping, means for connecting said foot members to the doors adjacent thereto whereby to control the position and movement of said doors, and latches for selectively holding said foot members to said frame whereby to determine the direction of tilting.

3. In a dump vehicle, a frame having side and end parts, three sets of foot members of which each set rests during transport on an individual side or end part of said frame, a dump body, longitudinal pivots for connecting the sets of foot members on the said side parts to said body, transverse pivots for connecting said set of foot members resting on the end part to said body, side and end doors pivoted to said body, and means including toggle mechanism for connecting the foot members and doors whereby the tilting of the body about any of said longitudinal and transverse pivots will select the adjacent door for automatic opening and closing movement and for holding the adjacent door closed during dumping in another direction.

4. A dump vehicle as in claim 3, including means supported by said frame for engaging selectively one of said sets of foot members whereby to determine the direction of tilting of said body.

5. A dump vehicle as in claim 3, in which said foot members have apertures in their bottom walls, and means are provided on said frame for entering said apertures to guide the foot members to and hold them in predetermined positions in a horizontal plane.

6. In a dump vehicle, a frame, a body, foot members pivoted to the body and resting on said frame during transport and each including a ledge, latches for engaging the tops of said ledges whereby to hold the corresponding foot members against movement away from said frame, manually operable latch elements for selectively moving said latches, alining means on the frame engaged with the foot members while the foot members are resting on the frame whereby to restrict relative horizontal movement between said body and frame and engageable by the corresponding foot members during return of the foot members from raised position whereby to establish the relative longitudinal alinement of the body with respect to the frame, and a dump body pivotally mounted on said foot members for tilting movement, said latches operating to select the direction of tilting of said body.

7. A dump vehicle as in claim 6 in which said latch elements include manually operable shafts, and the latches are mounted on said shafts for rocking movement therewith.

8. In a dump vehicle, a frame, a body adapted to tilt about laterally spaced and rear fulcrums for dumping, side and rear doors pivotally mounted on said body, and door control devices resting on said frame during transport and being pivotally connected to said body whereby to provide the fulcrums therefor and movable bodily with the body during tilting and including toggle mechanisms for holding the raised doors closed during dumping, and means on said frame for preventing rocking and shifting movements of said devices during tilting about the adjacent fulcrum.

9. In a dump vehicle, a frame, a body adapted to tilt about laterally spaced and rear fulcrums for dumping, side and rear doors pivotally mounted on said body, a mechanism on said frame for raising said body, foot members resting on said frame during transport, pivots for connecting the said foot members and body whereby the body may tilt about a selected pivot while a foot member connected to the pivot selected for tilting remains in engagement with the frame, and latches for selectively holding said foot members to said frame whereby to determine the direction of tilting of said body during energization of said raising mechanism.

10. In a dump vehicle, a frame, foot members resting on said frame during transport, a tiltable dump body resting on said foot members whereby the weight of the body and its contents are transmitted through said foot members directly to the frame during transport, pivots for connecting the said foot members and body whereby the body may tilt about the selected pivot, latches for selectively holding said foot members to the frame whereby to determine the pivot about which tilting shall occur, and alining members on the frame for interengaging with the foot members to determine the horizontal relative position of the body and frame, said alining members including upwardly extending portions which converge upwardly in both longitudinal and transverse upright planes.

11. In a dump vehicle, a frame, a body adapted to tilt laterally and to the rear with respect to said frame, foot members pivotally connected to the body and normally supported by said frame and providing laterally spaced and rear fulcrums about which the body may tilt for side and rear dumping, side and rear doors pivotally mounted on said body to fold down for dumping, each said foot having an extension toward the adjacent door with respect to the body pivot of said foot member, a telescoping link pivotally connected to said extension and to a portion of said door depending below its body pivot, and means for normally preventing the telescoping of said link whereby the link may operate in compression for controlling the opening and closing of the door during tilting of the body, said means yielding to excessive compression strains upon the link.

12. In a dump vehicle, a frame, a body adapted to tilt laterally and to the rear with respect to said frame, foot members pivotally connected to the body and normally supported by said frame and providing laterally spaced rear fulcrums about which the body may tilt for side and rear dumping, side and rear doors pivotally mounted on said body to fold down for dumping, each said foot having an extension toward the adjacent door with respect to the body pivot of said foot member, an extensible link pivotally connected to said extension and to a portion of said door extending below the body pivot thereof, said link operating by compression to control the opening and closing of the door during tilting of the body, and yielding by extension when the door is blocked during its opening movement.

13. In a dump vehicle, a frame, a tiltable dump body, foot members resting on said frame during transport and providing a support for the body and pivot mountings for the body during its tilting about a fulcrum provided by selected foot members at one side or the other of the frame and movable bodily during tilting of the body in another direction, side latch shafts on said frame extending longitudinally thereof, sets of latch members connected to said shafts for engaging and holding the foot members whereby to determine the tilting of said body about the adjacent side, a link connecting said shafts for simultaneous movement, and a manually operable member for moving said shafts simultaneously between two positions in each of which one of said sets of latch members is engaged with the foot members corresponding thereto and another set is released from the foot members corresponding thereto or to a third position in which both said sets are disengaged.

14. In a dump vehicle, a frame, a body mounted for tilting selectively about fulcrums at the opposite sides of said frame, side doors pivoted to said body to fold down, a control means for each door, said control means being disposed between a longitudinal medial plane through the body and the door with which it is associated, each control means including a member pivotally connected to the body, a telescoping link of limited extension pivoted to the outer end of said member and to a depending member on the door, said telescoping link permitting a relative free movement of the body and door and thereafter operating at its limit of extension for producing an opening movement of the door relative to the body during tilting of the body on the frame, said frame operating upon said member to prevent turning movement thereof during transport for holding the doors locked in closed position and for controlling the position of said member during the swinging of the door to open position, and means for selectively latching said control means for selecting the direction of dumping.

15. In a dump vehicle, a frame, a tiltable body, foot members resting on the frame during transport and providing a supporting means for the body and pivot mountings for the body during its tilting about a fulcrum provided by selected foot members at one of the sides or the rear of the frame and movable bodily during the tilting of the body in another direction, latching means including latches for selectively securing the foot members at either side and the rear of the frame whereby to determine the direction of tilting for dumping, independent manually operable devices for moving the latches at either side or the rear of the frame, and interlocking elements for connecting said independent devices whereby the side latches cannot be engaged while the rear latches are engaged.

16. In a dump vehicle, a frame, a body mounted for tilting selectively about fulcrums at the opopsite sides of said frame and at the rear of said frame, side doors pivoted to the body to fold down, a rear end door pivoted to the body to fold down, a control means for each door operating to permit the opening and for causing the closing of the door adjacent the fulcrum selected about which the body is to be tilted, said control means being disposed adjacent the door with which it is associated, each control means including a member pivotally connected to the body and contacting with said frame during transport, a link pivoted to the outer end of said member and to a depending member on the door, said frame operating upon said members to prevent turning movement thereof during transport for the holding of the doors locked in closed position, and means operating in conjunction with said frame for controlling the position of said members during the opening and closing of the door with which they are associated.

17. In a dump vehicle, a frame, a tiltable dump body, doors pivoted to said body, foot members resting on said frame during transport, pivots for connecting the said foot members and body whereby the body may tilt about a selected pivot while a foot member connected to the pivot selected for tilting remains in engagement with the frame, link means pivoted at one end directly to said foot members and pivoted at the other end directly to the doors adjacent thereto whereby to control the position and movement of said doors, a latch associated with each said foot member, and a common manually operable means for selectively actuating and controlling said latches for holding certain of said foot members immovable relative to said frame and for releasing others whereby to determine the direction of tilting.

HENRY FORT FLOWERS.